United States Patent
Hopenfeld

(12) 
(10) Patent No.: US 6,870,607 B1
(45) Date of Patent: Mar. 22, 2005

(54) METHOD AND APPARATUS FOR ANALYZING INFORMATION FROM SENSORS PROVIDED OVER MULTIPLE OPTICAL WAVEGUIDES

(76) Inventor: Joram Hopenfeld, 1724 Yale Pl., Rockville, MD (US) 20850

( * ) Notice: Subject to any disclaimer, the term of this patent is extended or adjusted under 35 U.S.C. 154(b) by 51 days.

(21) Appl. No.: 10/375,801

(22) Filed: Feb. 27, 2003

Related U.S. Application Data

(60) Provisional application No. 60/362,056, filed on Mar. 5, 2002.

(51) Int. Cl.⁷ ............................................. G01N 21/00
(52) U.S. Cl. .................................................... 356/73.1
(58) Field of Search ............................... 356/73.1, 35.5, 356/32, 477–479; 385/96, 12, 51, 73, 43; 250/227.14, 227.18, 231.1

(56) References Cited

U.S. PATENT DOCUMENTS

| | | | |
|---|---|---|---|
| 5,204,536 A | 4/1993 | Vardi | |
| 5,541,725 A | 7/1996 | Lieber | |
| 6,034,760 A | 3/2000 | Rees | |
| 6,352,002 B1 | 3/2002 | Weijer | |
| 6,587,189 B1 * | 7/2003 | Roberts et al. | ............ 356/73.1 |

* cited by examiner

*Primary Examiner*—Tu T. Nguyen
(74) *Attorney, Agent, or Firm*—Bruce Hopenfeld

(57) ABSTRACT

A system and method for obtaining information from sensor systems is disclosed. Light, corresponding to information from a plurality of sensors, is projected from a plurality of optical waveguides to a photodetector. The photodetector is coupled to an analog-to-digital converter, which converts an image detected by the photodetector to digital data, which is then stored in a digital memory. A processor extracts information regarding the state of the sensors by processing the digital data.

24 Claims, 8 Drawing Sheets

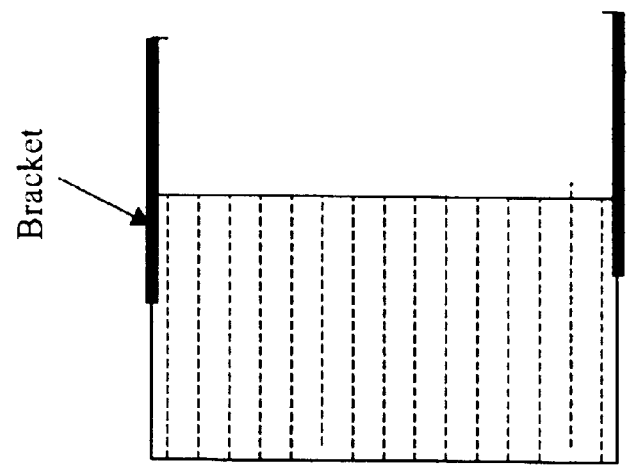
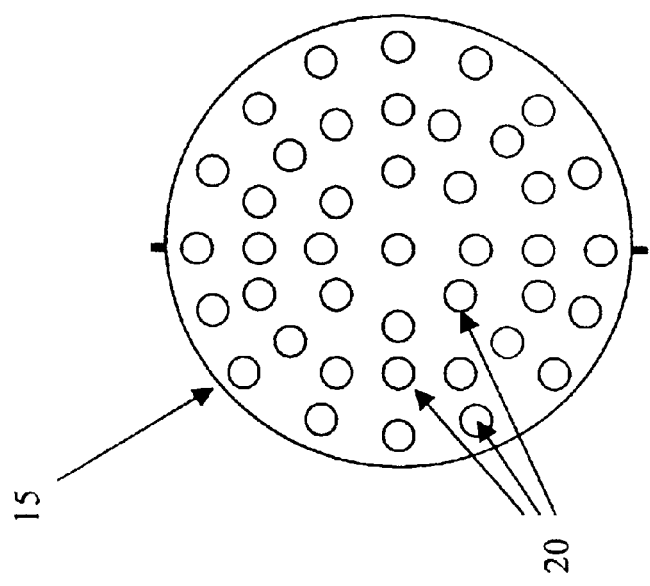
Fig. 3

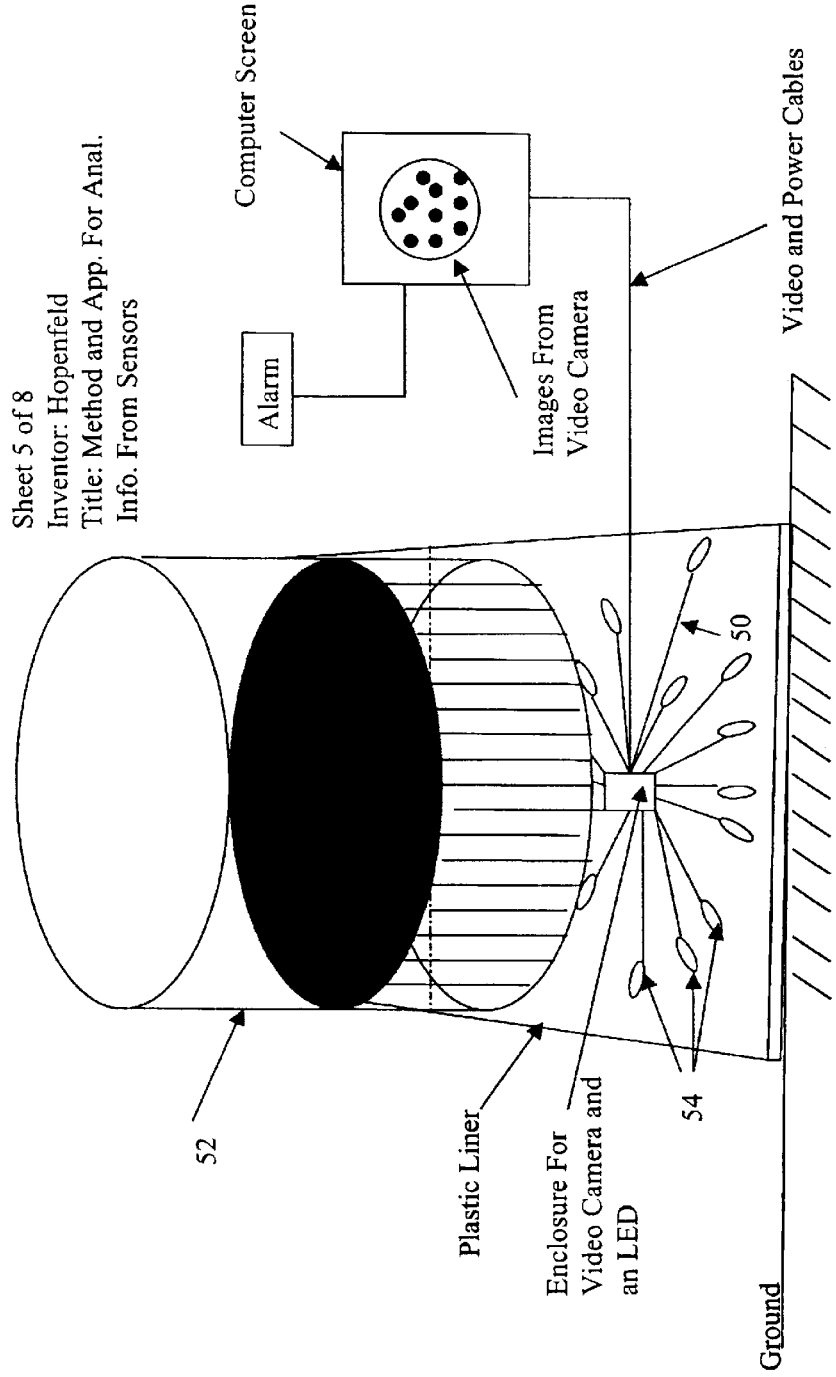
Figure 5 - Leak Monitoring Under Fuel Tanks

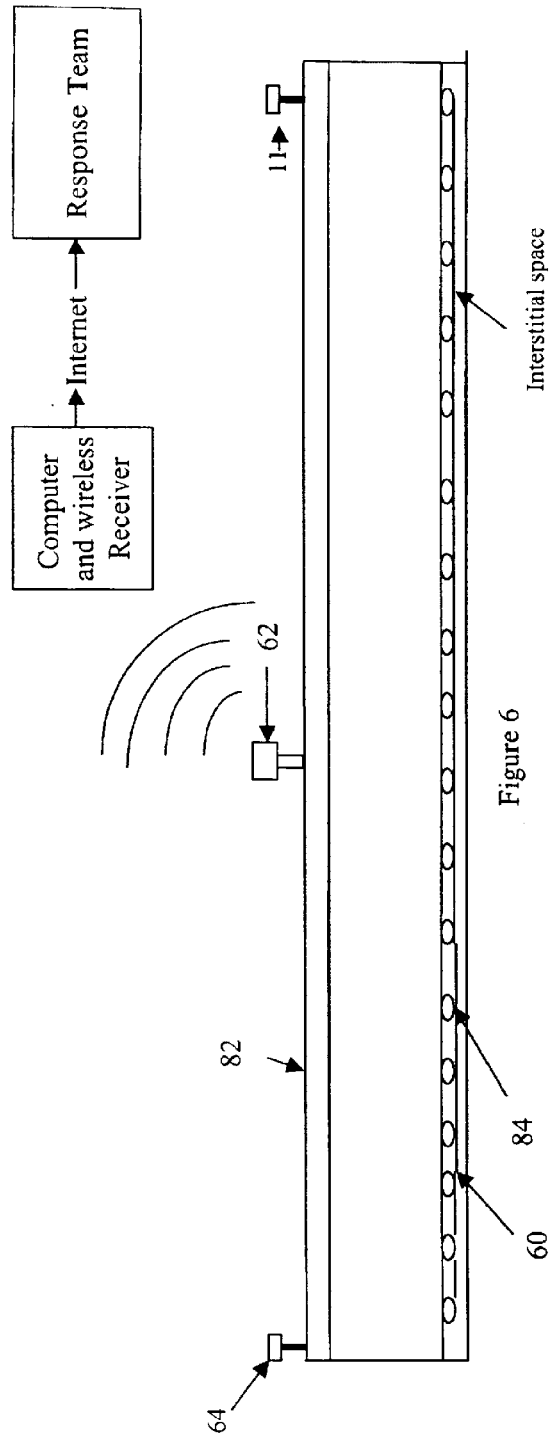
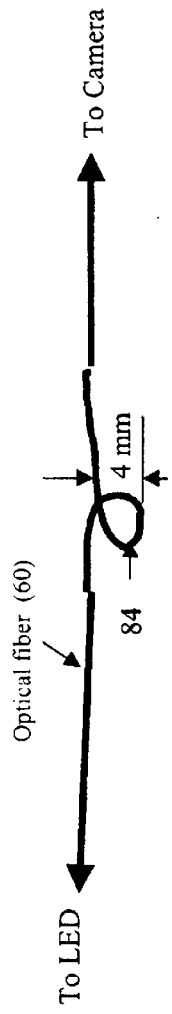
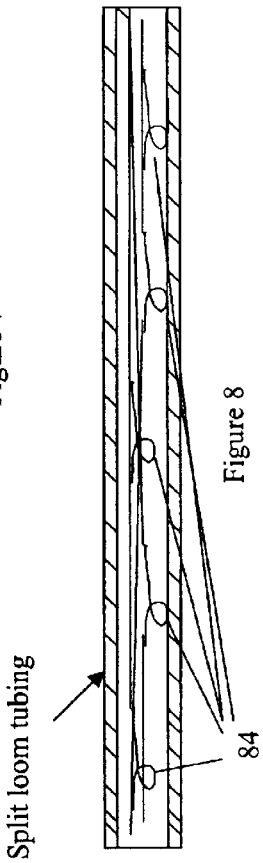
Figure 6
Figure 7
Figure 8

METHOD AND APPARATUS FOR ANALYZING INFORMATION FROM SENSORS PROVIDED OVER MULTIPLE OPTICAL WAVEGUIDES

PRIORITY

This application claims priority from provisional application Application No. 60/362,056 entitled "A Method for Monitoring a Distributed System of Fiber Optic Sensors," filed Mar. 5, 2002.

BACKGROUND OF THE INVENTION

1. Field of the Invention

The invention relates to a method of detecting and processing optical signals from multiple optical waveguides.

2. Art Background

There are many instances where it is necessary to obtain, at a central location, information provided by multiple sensors. As one example, distributed fiber-optic (FO) sensors, which are used in various industrial, medical and environmental monitoring applications, provide information over one or more optical waveguides. It is often required to identify a sensor or a number of sensors where an event has occurred.

When changes in light intensity are used as a recognition signal of a measured event, a variety of different methods are used to identify the individual sensor where the change in intensity had occurred. For example, an optical time domain reflectometer, OTDR, is commonly employed to locate intensity changes in an array of sensors connected in series. J. Burck and E. Sensfelder "Optical fiber sensors for the distributed measurement of hydrocarbons. SPIE, Vol 3540 pp 98–109. Hopenfeld (U.S. Pat. No. 5,200,615) presented a multi-sensor system where the individual sensors are coated with polymers containing fluorescent dyes or phosphor materials to detect and locate leaks. The coatings, emitting light at differing frequencies, reveal the location of the particular sensor, which was exposed to the leaking fluid. Optical pulses with varying width, amplitude and frequency were employed by Spillman, et al (U.S. Pat. No. 4,963,729) to interrogate individual sensors in a multi-sensor system. Maurice et al. disclosed (U.S. Pat. No. 5,408,092) a circuit for the interrogation of individual sensors in a distributed sensors system using a multiplexer which is controlled by a timing device and a logic circuit.

In certain applications, plastic optical fibers are used to both detect substances and transmit light to and from the sensing zone of the fiber. Hopenfeld (U.S. Pat. No. 5,828, 798) described such a method where the sensing zone is a small segment of the fiber in a form of a loop. Because of the poor transmission of light through plastic fibers the individual sensors can not be connected in series and therefore the use of an OTDR is not practical. The use of fluorescent dies or phosphor materials in conjunction with plastic fibers is also not practical for long distances because of the weakness of the signal and its large attenuation along the optical fiber.

Interfacing individual sensors with a programmable microcontroller can also be used to identify individual sensors by connecting individual photodetectors to the input/output (I/O) pins of the microcontroller. The use of these systems, however is limited to the number of I/O pins that are readily available. Ganging up several microcontrollers increases the size of the circuit boards, which in turn increases the cost of the enclosure. Microcontroller based systems also require considerable development initially and reprogramming each time the sensor configuration is changed.

It would be desirable to improve upon the above mentioned systems for obtaining information from multiple FO sensors. More generally, it would desirable to improve upon existing methods for obtaining and analyzing information from sensor systems.

SUMMARY OF THE INVENTION

The present invention meets the above mentioned needs by providing an inexpensive system and method for obtaining information from sensor systems. This is accomplished by directly or indirectly providing light, corresponding to information from sensors, from a plurality of optical waveguides to a photodetector. The photodetector is coupled to an analog-to-digital converter, which converts an image detected by the photodetector to digital data, which is then stored in a digital memory. A processor extracts information from the plurality of optical waveguides by processing the digital data.

For example, if the intensity of the light traveling through the plurality of optical waveguides is indicative of the state of sensors to which the waveguides are coupled, the processor can determine the state of the sensors by analyzing the intensity of the image stored in the digital memory. In one embodiment, the processor determines the state of a sensor by determining whether that portion of the image that corresponds to the sensor is bright or dark.

The image sensed by the photodetector may also be displayed on a computer screen, thereby directly providing human readable information regarding the state of various sensors.

Particular applications of the above mentioned device are also described.

BRIEF DESCRIPTION OF THE DRAWINGS

FIG. 3 is a more detailed view of a fiber optic connector shown in FIG. 2.

FIG. 4a shows a plurality of bright images that indicate that the corresponding sensors were not exposed to a particular item to be sensed. FIG. 4b shows a plurality of bright images and a plurality of dark images, wherein the dark images indicate that the corresponding sensors were exposed to a particular item to be sensed.

FIG. 5 illustrates a possible application of the system shown in FIG. 2. In particular, FIG. 5 illustrates a plurality of distributed sensors below a vessel containing hazardous liquid.

FIG. 6 illustrates another possible application of the system shown in FIG. 2. In particular, FIG. 6 illustrates a plurality of distributed sensors for the detection of leaks along dual containment pipelines.

FIG. 7 illustrates the configuration a sensing loop that comprises a portion of the fiber optic sensors employed in the system shown in FIG. 6.

FIG. 8 illustrates how the sensors shown in FIG. 6 are embedded in the interstitial space of a pipeline shown in FIG. 6.

FIG. 9 illustrates a plurality of distributed sensors for monitoring liquid levels.

DETAILED DESCRIPTION OF THE INVENTION

Definitions

As used herein, a "photodetector" is a device that converts the light energy corresponding to an image to a different type of energy, typically electrical energy. A single photodetector may comprise an array of sub-photodetectors that, taken as a group, detect an image. An image is a representation of a continuous portion of space.

As used herein, a "sensor" is a device that is capable of producing a signal upon detecting a change in an environment.

System Overview and General Considerations

The present invention discloses a method and an apparatus relating to sensors and optical waveguides. Although the invention describes specific sensors and specific electrical circuits it will be appreciated by a person with ordinary skill in the art that such details are disclosed simply to provide a thorough understanding of the invention.

Figure 1:
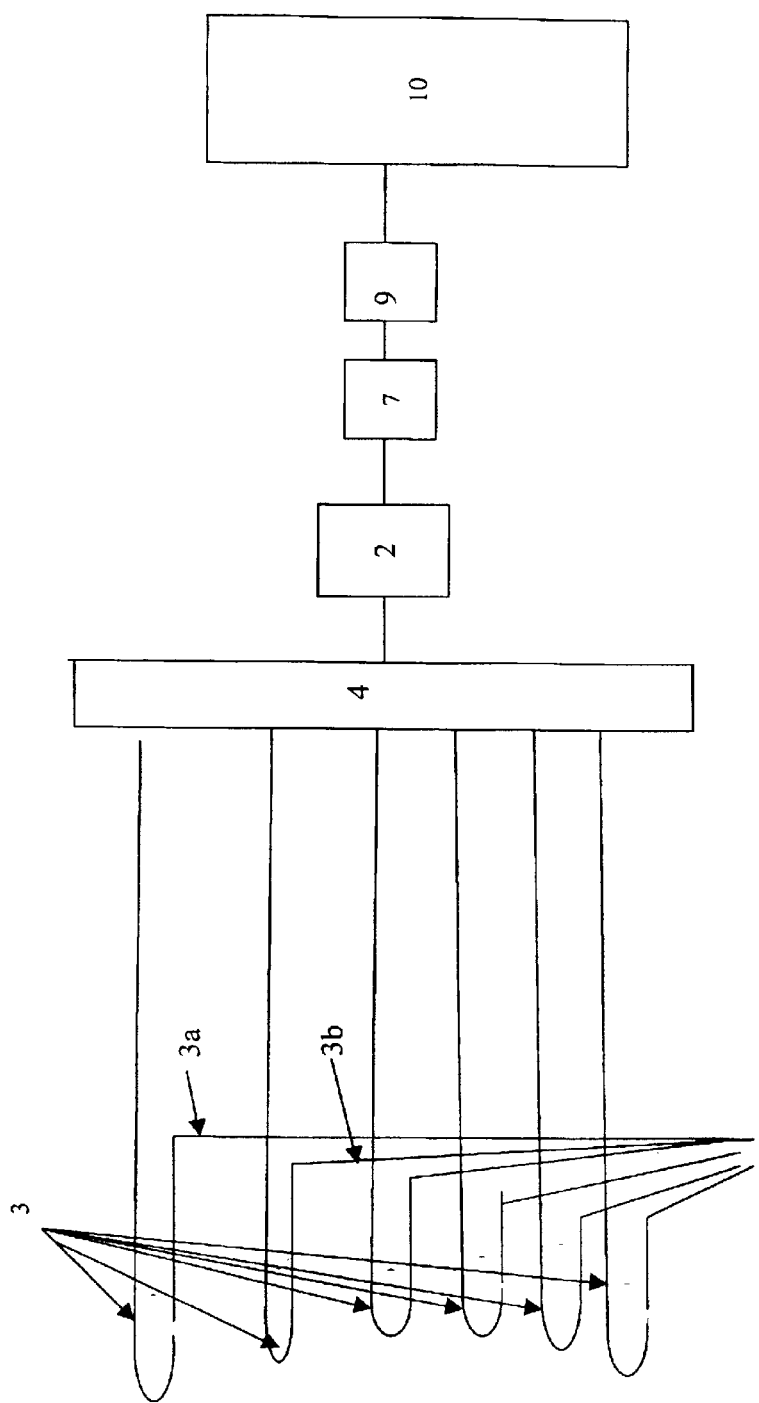
FIG. 1 is a diagram that shows the preferred embodiment of the present invention's system for obtaining information provided by sensors over multiple optical waveguides.

FIG. 1 illustrates the preferred embodiment of the invention. The preferred embodiment comprises a photodetector 2, a lens 4, an array of optical waveguides 3 including waveguides 3a and 3b, an analog-to-digital converter 7, a digital memory 9 and a processor 10. The photodetector 2 and the lens 4 are positioned such that they are capable of simultaneously receiving light provided by the optical waveguides 3a and 3b. The photodetector 2 has an output that provides an analog signal representing an image sensed by the photodetector 2. The analog-to-digital converter 7 is coupled to the output of the photodetector 2 and converts the analog signal to a digital signal representing the image. The processor 10 may comprise a general purpose computer or a specialized processor.

The digital memory 9 is coupled to the analog-to-digital converter 7 such that the digital memory 9 is capable of storing the digital image in discrete units. The processor 10 coupled to the digital memory 9, and is configured to obtain information from both the first and the second waveguides 3a and 3b by analyzing the image stored in the digital memory 11. For example, if the intensity of the light traveling through the first and second waveguides 3a and 3b is indicative of the state of sensors (not shown) to which the first and second waveguides 3a and 3b are coupled, the processor 10 can determine the state of the sensors by analyzing the image stored in the digital memory 9.

Although it is preferable to position the photodetector 2 such that it directly receives light from the first and second waveguides 3a and 3b, the present invention encompasses any scheme in which the information traveling through the first and second waveguides 3a and 3b is provided to the photodetector 2. For example, the first and second waveguides 3a and 3b could be coupled to first and second light amplifiers (not shown), which could provide light to the photodetector 2. There are many other possible schemes for providing the signals, carried by light in the first and second waveguides 3a and 3b, in the form of light detectable by the photodetector 2.

Figure 2:
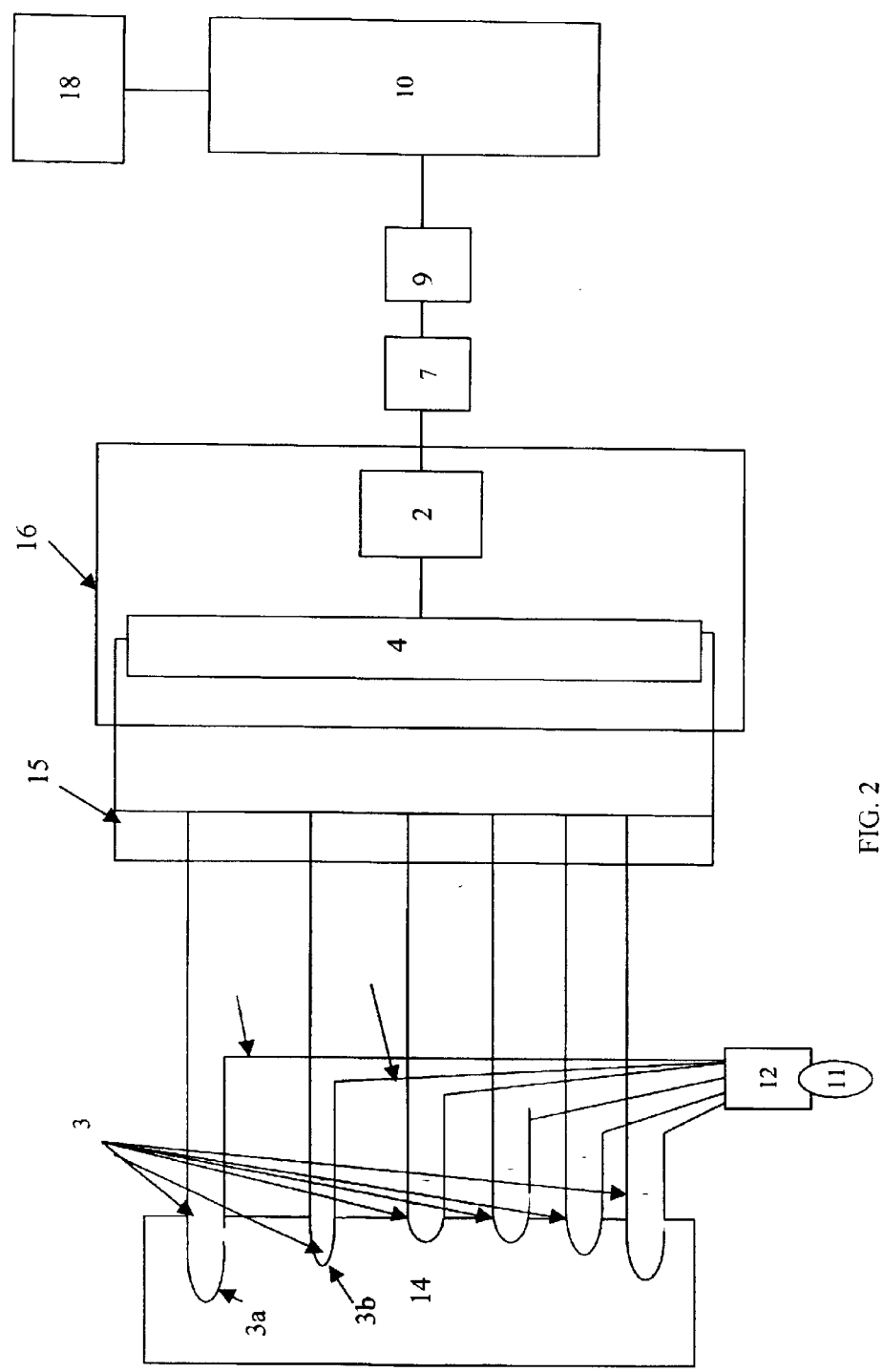
FIG. 2 shows the device of FIG. 1 employed in the context of a distributed fiber optic sensor system.

FIG. 2 shows the system described in FIG. 1 in the context of a fiber optic sensing system. The components in FIG. 1 are shown with identical numbers in FIG. 2. FIG. 2 further shows a light source, LED 11, a multi-fiber LED connector 12, an environment 14, a multi-fiber camera connector 15 and a display 18 coupled to the processor 10. In the embodiment shown in FIG. 2, the photodetector 2 and lens 4 are both embodied within a video camera 16. The analog-to-digital converter 7 may also be embodied with the video camera 16. Further, the photodetector 2 comprises a plurality of photodetectors in the form of light sensitive semiconductor diodes. The optical waveguides 3a and 3b are positioned with respect to the camera 16 by the camera connector 15 as will be described in more detail with reference to FIGS. 3–5.

Preferably, each of the fibers in the array 3 includes a sensing portion, 3as and 3bs respectively, which preferably comprise loops of the fibers 3a and 3b as described in more detail in U.S. Pat. No. 5,828,798, the subject matter of which was invented by the inventor of the present invention. The sensing portions 3as and 3bs sense the presence or absence of a fluid or other material in the environment 14.

The system shown in FIG. 2 operates as follows. Light originating at the LED 11 enters each of the individual fibers in the array 3, which are held together in a tight bundle by the LED connector 12 in an area adjacent to the LED 11. The light originating with the LED 11 passes through the sensing portions 3a and 3b where some of the light is reflected into the environment 14 and the remaining amount is transmitted through the optical waveguides 3a and 3b where it is projected on a pixel photodetector array inside the camera 16. The video signals are then digitized by the analog to digital converter 7 within the camera 16 and processed as described in more detail below. The images sensed by the camera 16 and/or the result of the processing may be displayed on the display 18.

In the preferred embodiment shown in FIG. 2, the processor 10 is configured to analyze an image by separately analyzing data corresponding to the first and second optical fibers 3a and 3b, respectively, thereby obtaining information corresponding specifically to the first and second optical fibers 3a and 3b, respectively. In particular, a first predetermined portion of the digital memory 9 will correspond to the first optical fiber 3a and a second predetermined portion of the digital memory 9 will correspond to the second optical fiber 3b. The location of the first and second predetermined portions in the digital memory 9 will depend on the respective positions of the first and second optical fibers 3a and 3b with respect to the camera 16.

Of course, due to the dispersion of light, the digital data in the first and second predetermined portion of the digital memory 9 may be formed at least in part from the combination of light from both the first and second optical fibers 3a and 3b. Nonetheless, the positioning of the first and second optical fibers 3a and 3b and the intensity of light transmitted there from may be adjusted so that the first and second predetermined portions, respectively, will consist mainly of data from the first and second fibers 3a and 3b, respectively. In other words, there may be substantially no overlap between the sub-images corresponding to the first and second optical waveguides 3a and 3b, as is illustrated in FIGS. 4 and 5, which will be further described below.

Further, based upon the positions of the first and second optical waveguides 3a and 3b and the range of intensities of light to be transmitted therefore, the processor 10 may be configured with appropriate image processing software to extract information corresponding specifically to the first and second waveguides 3a and 3b, respectively. Hereafter, that portion of an image corresponding mainly to one of the first or second optical waveguides 3a or 3b will be referred to as a "sub-image".

The brightness of the individual sub-images sensed by the photodetector 2 depends on the amount of light that was reflected into the environment 14 by the sensors (3as and 3bs) corresponding to the sub-images. In the absence of the fluid that is being detected (analyte), each sensor projects a bright image which is easily distinguished from the background light that has been seen by the camera 16. Conversely, when a sensor (3a or 3b) is contacted by an analyte, its corresponding sub-image blends with the background. The light intensity of the LED 11 can be adjusted to provide the required image brightness. A "dummy" optical waveguide carrying a reference signal may be employed to help distinguish between light and dark images.

Many different image processing procedures may be implemented to obtain information from the optical waveguides 3a and 3b. In the case where the state of the sensor 3as or 3bs is indicated by the presence of absence of brightness, the following scheme has been found to work. The processor 10 may be configured to search through the image stored in the memory 9 to determine whether a particular pixel exceeds a predetermined threshold. If so, a counter is incremented. The pixel is part of a predetermined portion of the memory 9 associated with a particular sub-image which is associated with a particular sensor (3as or 3bs). Each pixel in this entire predetermined portion of the memory 9 may be set to a low (e.g. black) value so that any sub-image (or sensor 3as or 3bs) is only counted once. After the entire image has been searched, the counter stores the number of sensors (3as or 3bs) that were off (i.e. projected a bright image).

FIG. 3 is an expanded view of the connector 15, which positions the optical waveguides 3a and 3b with respect to the camera 16. The connector 15 preferably comprises a cylindrical plastic body containing N number of through holes 20 to provide a snug fit for the plastic fibers in the array 3. The ends of the fibers in the array 3 terminate at the end of the connector 15 facing the camera 16 (see FIG. 2). Each of the fibers in the array 3 is assigned a position in the connector 15 which corresponds to a known location of the corresponding sensing portion (e.g. 3a or 3b) in the environment 14. In the embodiment show in FIG. 3, the holes 20 are arranged in concentric circles with the first optical waveguide 3a located at the 12 o'clock position of the outer circle and the other optical waveguides in the array 3 located sequentially. The fibers in the array 3 can be arranged in any convenient pattern in the connector 15.

Figure 4B:
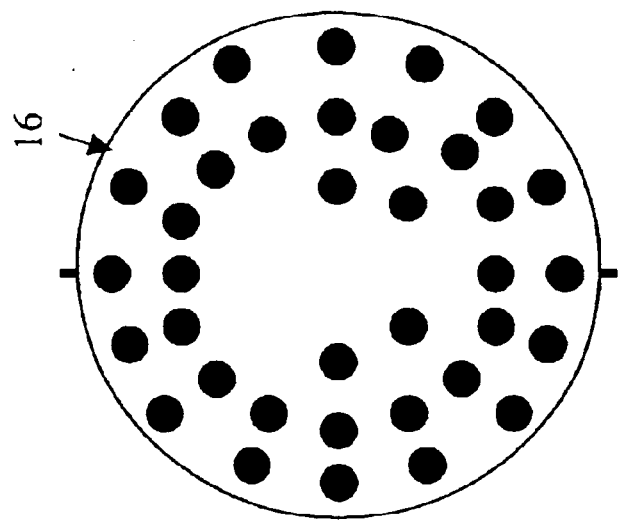
FIGS. 4a and 4b show exemplary light patterns that may be processed by the device shown in FIG. 1. In particular.
Figure 4A:
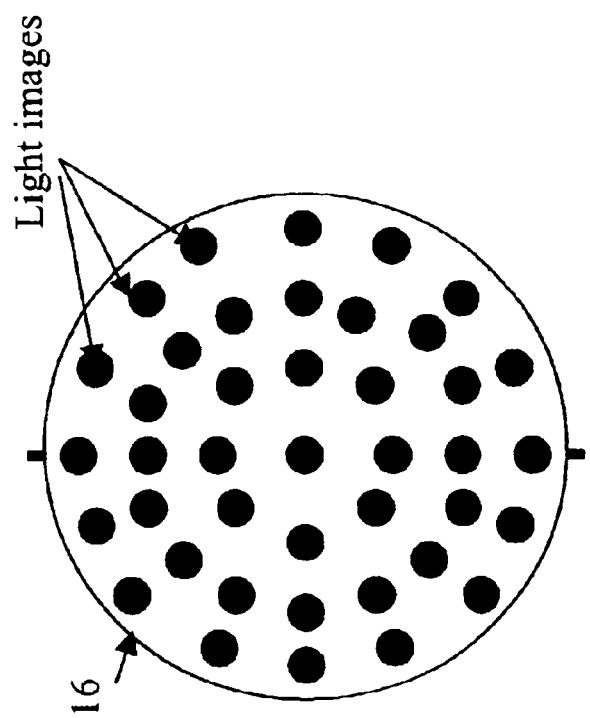

FIG. 4a illustrates images sensed by the camera 16 where none of the sensing portions corresponding to the optical waveguides in the array 3 is exposed to an analyte, so that all of the corresponding sub-images are bright. FIG. 4b, in contrast, shows an image where six of the sensing portions are exposed to the analyte so that the corresponding sub-images are dark. The dark or light patterns can be identified visually by their absence on the display 18 or a computer program can also be written to print or verbally announce the affected sensing portions.

In addition to determining the state of a sensor according to the total brightness of a sub-image, the processor 10 may be configured to obtain information regarding a sensor (or more generally from one of the optical waveguides 3a or 3b) according to a substantially continuous function of the light intensity of the sub-image. For example, there may be a linear relationship between total brightness of a sub-image and the amount of fluid adjacent to sensor. Many other image processing techniques may be employed to extract information from images sensed by the photodetector 2.

In the embodiment shown in FIG. 2, the number of optical waveguides in the array 3 that can be monitored by the camera 16 can be in the thousands although the exact number will depend on specific fiber diameter and connector size. For example, a camera connector that is 0.75" in diameter and 2 inches long can be used with an off-the-shelf miniature low cost video camera. The number of fiber optic waveguides, N that can be accommodated by this set up can be conservatively estimated by multiplying the area of the connector by 0.3 and dividing by the cross sectional area of the fiber N=0.5 (D/d)2. For D=0.75" and fiber diameters ranging between 0.5 to 1.0 mm the corresponding number of fibers is 435 and 108. The above calculations provide a low bound on the number of sensors because it was assumed that only 30% of the connector's cross sectional area is usable without overlapping holes.

It will be appreciated that the present invention is not limited to fiber-optic sensors. Sensors of any type may be interfaced to the optical waveguides in the array 3. Instead of using clock pulses of various widths to represent individual voltage as described by Tondall, et. al (U.S. Pat. No. 4,782,330), the present invention converts the voltage output of each sensor to optical power. The individual lights (LEDs or Lasers) are adapted to transmit light directly or through fiber optic cables to a video camera in a manner discussed above.

Applications

This section will describe the application of the invention to different systems designed to monitor the environment and liquid levels.

1. Detection of Leaks From Storage Tanks Containing Hazardous Liquids

FIG. 5 depicts a distributed sensor system that covers the area below a tank containing either liquid fuel or hazardous chemicals. A 40 foot diameter storage tank 52 in this example, is above ground however, the same basic arrangement is applicable to below ground tanks. The area below the tank 52 is divided into 2'×2' squares with one of a plurality of sensor loops 54 embedded in each square, totaling 400 sensors. Each of the sensors 54 comprises a portion of one of plurality of optical waveguides 50. The individual sensors 54 are taped to a grid marked plastic liner with the second end of the corresponding one of the optical waveguides 50 labeled in accordance with its loop location on the grid. The marked ends are then interfaced with a system such as that shown in FIG. 2. The optical waveguides 50 are inserted into the connector 15 (FIGS. 2–3) in a known order. All the first ends of the fibers 50 are bundled and are connected to an LED (corresponding to LED 11 in FIG. 2). The LED, and the video camera (corresponding to the video camera 16 in FIG. 2) are sealed in a 2×3×4 plastic box which is attached to the liner approximately at its center. The liner is laid on the ground below the tank 52 and then is covered with few inches of topsoil. A Siamese cable RG59 that incorporates a power and a video signal cable connects the camera 16 to a personal computer (such as the processor 10 in FIG. 2) via an analog to digital converter (element 7 in FIG. 2) and a USB connector. The computer activates a visual and an audible alarm when a sensor is wetted by fuel.

The cost advantage of the present invention can be appreciated when one considers that the material cost for the 400 sensors the video camera and the connecting cables can be purchased for less than a $1.0 per sensor or $0.25/square foot. The optical waveguides 50, type PRG-FB 500, can be purchased from Moritex USA, Inc. The black and white board video camera, ⅓" CCD, 350 TV waveguides and the transmitters can be purchased from A Touch of Gray Industries Inc, Irvine Calif.

2. Detection of Leaks along Pipelines

FIG. 6 shows a leak detection system for a 400' long dual containment pipe. 80 sensors 84, equally spaced, are positioned in the interstitial space of a pipe 82. Each of the sensors 84 comprises a portion of one of a plurality of optical waveguides 60. The configuration of the sensors 80 is shown in FIG. 7. The optical waveguides 60 are interfaced with the system shown in FIG. 2. As shown in FIG. 6, a camera 62 (corresponding to the camera 16 of FIG. 2) is positioned at the mid-span of the pipe 82 and an LED 64 (corresponding to the LED 11 in FIG. 2) is positioned at each end of the pipe 82. The optical waveguides 60 comprise PRG-FB500, plastic fibers 200' long each are enclosed in split loom tubing which can be purchased from Mouser Electronics Catalog (481-1007). The split loom tubing is spread open every 5 feet and a loop is formed successively in each of the fibers 60 for form the sensors 84, as shown in FIG. 8. The looms are snaked into the interstitial space from both ends of pipe 82. Using a wireless transmitter/receiver pair the status of pipe integrity can be monitored through the Internet.

3. Distributed Sensor System for Tank Gauging

Figure 9:
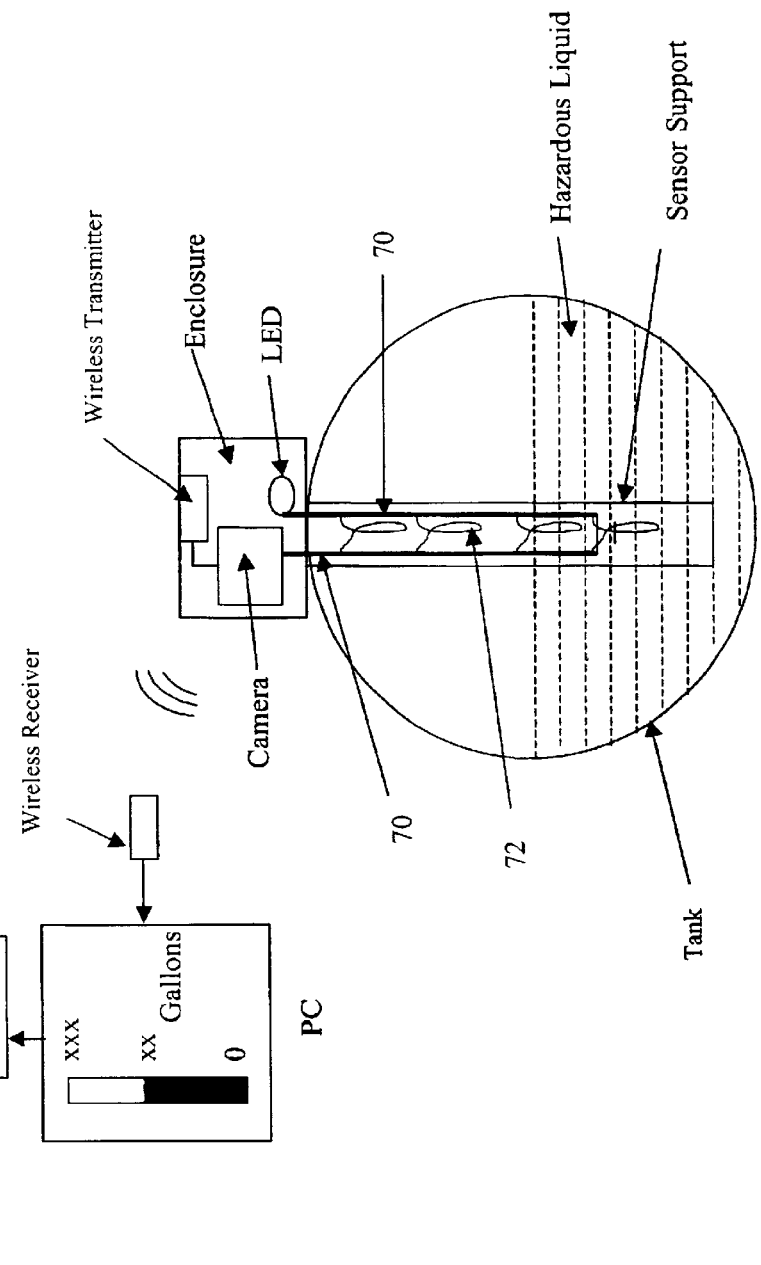
FIG. 9 illustrates yet another possible application of the system shown in FIG. 2. In particular

FIG. 9 depicts a distributed sensor system to measure liquid levels. A plurality of sensors 72 are spaced apart vertically at a given distance that is determined by the required level measurement accuracy. Clips or wire wraps are used to attach the sensors 72 to a flat or a round bar for support and are identifiable by their distance to a known reference level in the vessel. Each of the sensors 72 comprises a portion of one of a plurality of optical waveguides 70. The optical waveguides 70 are interfaced with the system shown in FIG. 2. In this case, the optical waveguides 70 may be inserted in the connector 15 (FIGS. 3–4) randomly. In particular, since the sensors 72 are wetted or unwetted in sequence when the level in the vessel changes, it is not required arrange the ends in a known pattern. Liquid level in the vessel at any time is determined by counting, with the appropriate software, the number of distinct images that are being received by the processor 9 (FIG. 2). The liquid capacity in the tank can be determined from the number of images that were counted, the spacing between the sensors 72, the location of the reference point relative to a sensor and the geometry of the vessel. The liquid inventory in the vessel can be displayed on the display 18 (FIG. 2). The processor 9 can also be adapted to transmit capacity data in a binary language to a digital meter for viewing at another location. A digital meter suitable for that purpose can be purchased from Texmate Inc.

4. Door Monitoring System

Door monitoring systems are used in many industries, such as nursing homes. Commonly, a simple magnetic door switch is activated each time the door is moved. The on/off signal from the switch is transmitted to a multiplexer, by a wire or a wireless system, to a central control board to trigger an alarm.

Figure 10:
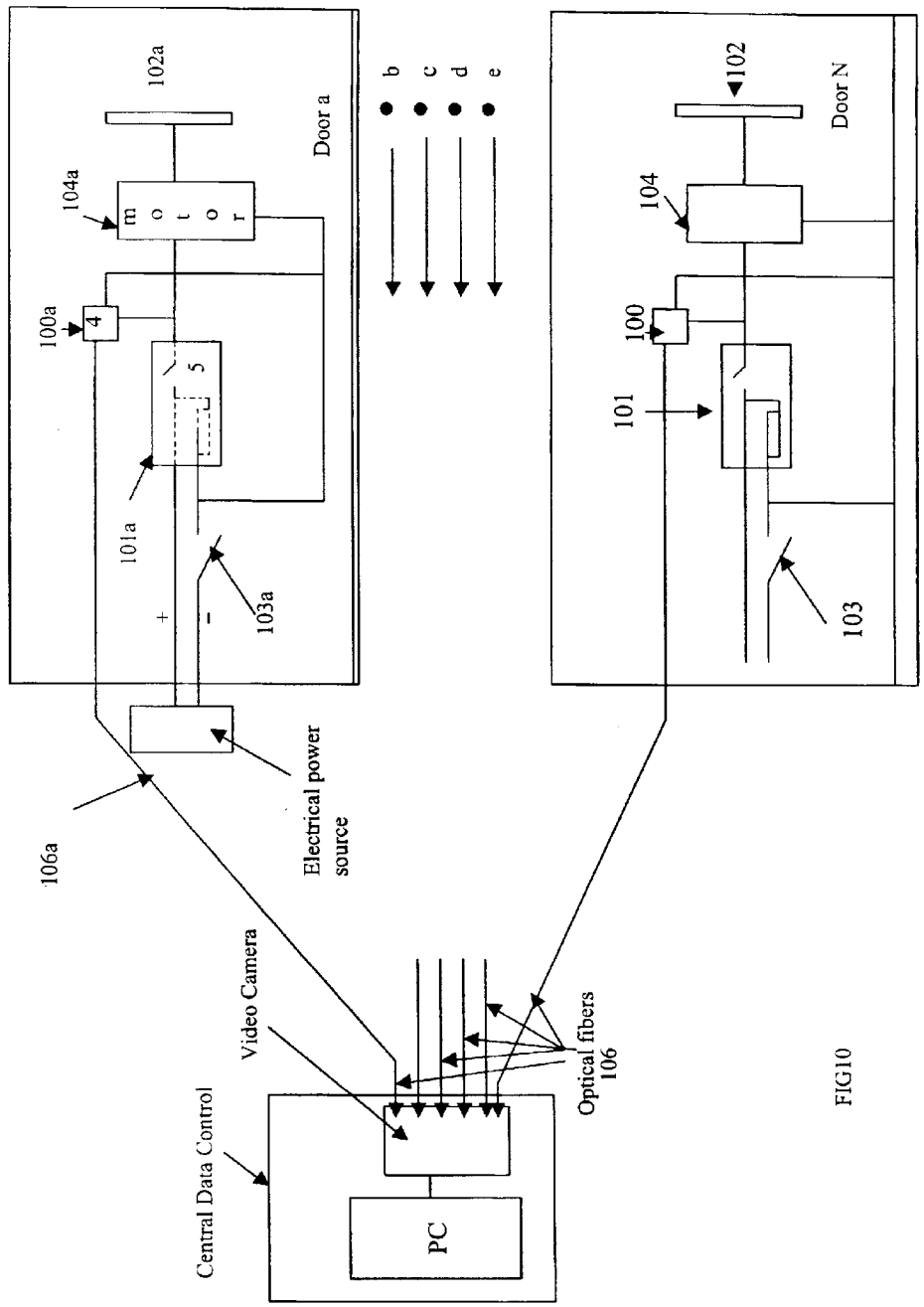
FIG. 10 depicts the use of the present invention to monitor the movement of automatic doors in a building.

FIG. 10 depicts the use of the present invention to monitor the movement of automatic doors in a building. The system comprises a plurality of LED's 100 corresponding to a plurality of doors 102. Each of the doors 102 is activated by a corresponding one of a plurality of motors 104, each of which being controlled by one of a plurality of relays 101 and one of a plurality of external switches 103. When one of the switches 103, such as switch 103a, closes, a corresponding relay 101a is activated, thereby resulting in the movement of a door 102a by a motor 104a.

The activation of the relay 101a also sends a signal to a corresponding LED 100a, which transmits light through one of a plurality of optical waveguides 106, which are interfaced with the system shown in FIG. 1 and processed accordingly. Since the optical waveguides corresponding to different LED's may be arranged in a known order, the opening or closing of any given door can be identified and trigger an audible alarm by a PC and simultaneously observed on a computer or a TV screen.

In this case, the relay 101a acts as a sensor, and the electrically activated LED 100a acts as a coupler, which couples the sensor (relay 101a) to the optical waveguides 106. Since the LED 100a also converts a sensor signal in one form, electrical current, to light, it also acts as a transducer.

The above fiber optic/video camera based system provides important advantages over existing systems. For example, the transmission of the door switch signal is not affected by lightning, and is intrinsically safe and hundreds of doors can be monitored by a low cost, easily to install and maintain control station.

Many alterations of the system shown in FIG. 10 are possible. To name but a few, more than one sensor may be interfaced with a single optical waveguide and there may be additional types of transducers and/or communication devices between a sensor and an associated optical waveguide.

While the invention has been described in conjunction with the preferred embodiment it is evident that numerous alternatives, variations and uses will be apparent to those skilled in the art in light of the forgoing description. The scope of the invention should thus be measured by the following claims:

I claim:

1. A device for obtaining information regarding sensors from light transmitted through plurality of optical waveguides, each of the waveguides having a first end coupled to a light source and a second end, comprising:
   a. a photodetector positioned such that it is capable of simultaneously receiving light corresponding to a first signal from a first sensor and a second signal from a second sensor provided respectively by first and second optical waveguides, the photodetector having an output providing an analog signal representing an image sensed by the photodetector, wherein the image sensed by the photodetector corresponds to information other than a single visual image;
   b. an analog-to-digital converter coupled to the output of the photodetector for converting the analog signal to a digital signal representing the image;
   c. a digital memory coupled to the analog-to-digital converter such that the digital memory is capable of storing the digital image; and
   d. a processor coupled to the digital memory, wherein the processor is configured to obtain information regarding the state of the first and second sensors by analyzing the image stored in the digital memory.

2. The device of claim 1 further comprising a video camera, wherein the photodetector is incorporated within the video camera.

3. The device of claim 2 wherein the analog-to-digital converter is incorporated within the video camera.

4. The device of claim 1 wherein the photodetector is positioned such that it receives light directly from the first and second optical waveguides.

5. The device of claim 1 wherein the processor is configured to analyze an image by separately analyzing digital data corresponding to the first and second optical waveguides, respectively, thereby obtaining information corresponding specifically to the first and second optical waveguides, respectively.

6. The device of claim 5 wherein each of the optical waveguides is positioned in a predetermined manner with respect to the photodetector such that each of a plurality of predetermined portions of the digital memory corresponds to a particular one of the optical waveguides.

7. The device of claim 6 wherein the photodetector is positioned such that it receives respective sub-images from the first and second optical waveguides, and there is substantially no overlap between the sub-images corresponding to the first and second optical waveguides.

8. The device of claim 7 wherein the processor is configured to obtain information from the first optical waveguide based on the total brightness of its corresponding sub-image.

9. The device of claim 8 wherein the processor is configured to determine whether the total brightness of the sub-image corresponding to the first optical waveguide is above a predetermined threshold.

10. The device of claim 8 wherein the processor is configured to obtain information from the first optical waveguide according to a substantially continuous function of total brightness of the sub-image corresponding to the first optical waveguide.

11. The device of claim 1 where the processor is configured to obtain information by analyzing light intensity.

12. The device of claim 1 wherein the photodetector is positioned such that it receives respective sub-images from the first and second optical waveguides, and there is substantially no overlap between the sub-images corresponding to the first and second optical waveguides.

13. The device of claim 1 further comprising a lens positioned so as to focus light on the photodetector.

14. The device of claim 13 wherein the positioned with respect to the photodetector such that substantially all of the light that impinges on the photodetector passes through the lens.

15. The device of claim 1 wherein the first and second optical waveguides comprise fiber optic waveguides.

16. The device of claim 1 wherein the first and second sensors sense a change in an environment by transducing information regarding the change in the environment into light.

17. A device for obtaining information regarding sensors from light transmitted through plurality of optical waveguides, each of the waveguides having a first end coupled to a light source and a second end, comprising:
   a. a photodetector positioned such that it is capable of simultaneously receiving light corresponding to first and second signals provided respectively by first and second optical waveguides, the photodetector having an output providing an analog signal representing an image sensed by the photodetector;
   b. an analog-to-digital converter coupled to the output of the photodetector for converting the analog signal to a digital signal representing the image;
   c. a digital memory coupled to the analog-to-digital converter such that the digital memory is capable of storing the digital image; and
   d. a processor coupled to the digital memory, wherein the processor is configured to obtain information regarding the state of at least two sensors by analyzing the image stored in the digital memory;
   wherein each of the optical waveguides is positioned in a predetermined manner with respect to the photodetector such that each of a plurality of predetermined portions of the digital memory corresponds to a particular one of the optical waveguides.

18. The device of claim 17 further comprising a connector comprising a plurality of holes, wherein each of the optical waveguides is inserted into a corresponding one of the plurality of holes such that the position of the second end of each of the plurality of optical waveguides is fixed by the connecter.

19. A distributed sensor system comprising:
   a. first and second sensors;
   b. first and second optical waveguides;
   c. first and second couplers, each of the first and second couplers coupling a corresponding one of the first and second sensors to a corresponding one of the first and second optical waveguides;
   d. a photodetector positioned such that it is capable of simultaneously receiving light corresponding to first and second signals provided respectively by the first and second optical waveguides, the photodetector having an output providing an analog signal representing an image sensed by the photodetector, wherein the image sensed by the photodetector corresponds to information other than a single visual image;
   e. an analog-to-digital converter coupled to the output of the photodetector for converting the analog signal to a digital signal representing the image; and
   f. a digital memory coupled to the analog-to-digital converter such that the digital memory is capable of storing the digital image.

20. The system of claim 19 further comprising a processor coupled to the digital memory, wherein the processor is configured to obtain information from both the first and the second optical waveguides by analyzing the image stored in the digital memory.

21. The system of claim 19 further comprising a display coupled to the memory such that the display is configured to show an image sensed by the photodetector in human readable form.

22. The system of claim 19 wherein the first and second sensors comprise portions of the first and second optical waveguides, such that the first and second couplers comprise portions of the first and second optical waveguides.

23. The system of claim 19 wherein each of the couplers comprises a transducer.

24. The system of claim 18 wherein the first and second sensors sense a change in an environment by transducing information regarding the change in the environment into light.

* * * * *